Patented Feb. 9, 1954

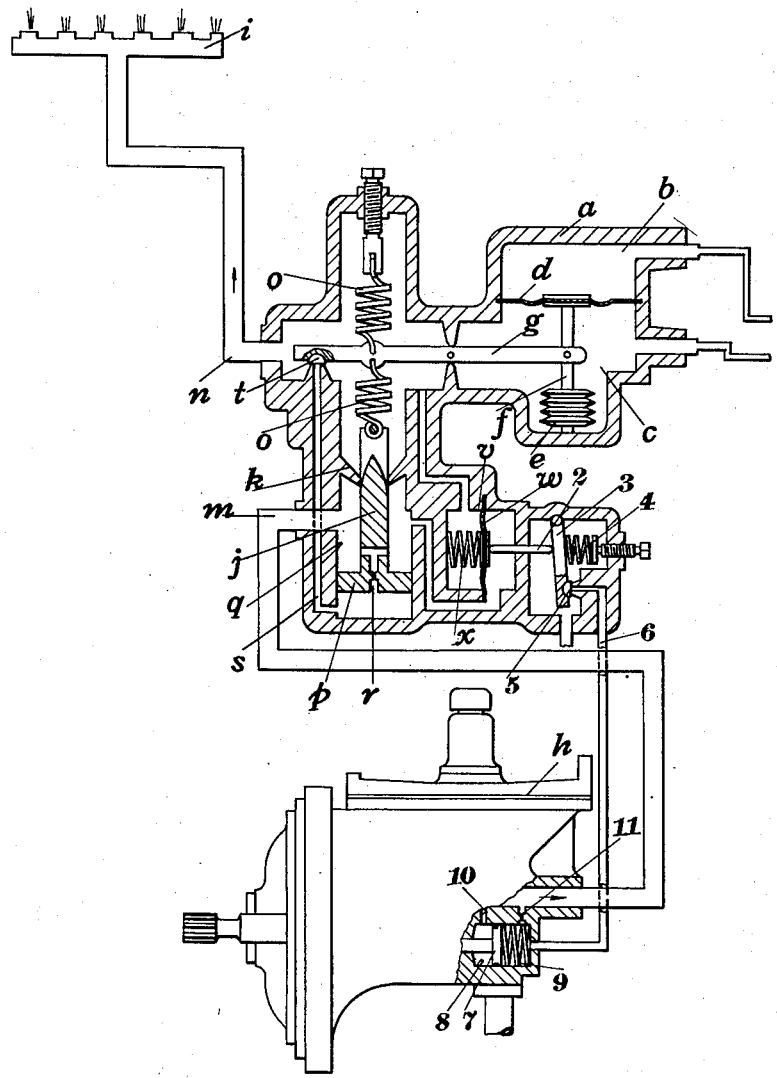

2,668,415

UNITED STATES PATENT OFFICE 2,668,415

MEANS FOR AUTOMATICALLY CONTROLLING THE SUPPLY OF LIQUID FUEL TO PRIME MOVERS

Owen Napier Lawrence, Dorridge, England, assignor to Joseph Lucas Limited, Birmingham, England Application November 14, 1951, Serial No. 256,335

Claims priority, application Great Britain November 17, 1950

3 Claims. (Cl. 60—39.28)

This invention relates to means for automatically controlling the rate of supply of liquid fuel to such prime movers as jet engines, gas turbines or the like, in response to pressures associated with the liquid fuel and the blower air, these pressures being utilised to vary the output of the fuel pump, or actuate a throttle or otherwise regulate the rate of flow of fuel to the prime mover. Known forms of such means effectively regulate the rate of flow under full or medium load conditions, but difficulty is encountered in effecting satisfactory regulation under idling conditions, the rate of fuel being then in excess of that required.

The known fuel-air regulating means hitherto employed are divisible broadly into two classes. In the one, the part acted on by the blower-air pressure comprises, for example, a pair of coaxial and interconnected deformable elastic capsules of equal diameter, and arranged to act on a lever having one end located between the capsules. One of the capsules is evacuated, and the other receives air at blower pressure in its interior, so that the force acting on the lever corresponds to the absolute pressure of the blower air.

A device in the other class comprises, for example, a diaphragm which divides a chamber into two compartments, one of which is open to atmosphere, and the other of which is supplied with air at blower pressure, so that the force acting on the diaphragm for causing the latter by its deflection to actuate an associated part, is equal to the difference of the blower-air and atmospheric air pressures.

While any of the devices exemplified by the foregoing and arranged in conjunction with means responsive to fuel pressure, are capable of giving the desired control of the fuel-air ratio at medium and maximum load conditions, they are inherently incapable of effecting also the desired control under idling conditions of the prime mover, the ratio of fuel to air being then undesirably in excess of what is required by the prime mover.

The problem underlying the present invention is that of enabling the desired control of the fuel-air ratio under all conditions of load to be obtained in a manner which is both simple and involves a minimum of departure from established practice.

The invention comprises a fuel regulating means in which the part to be actuated by blower-air pressure comprises the combination of a body part having therein a chamber, a flexible diaphragm, or piston, which divides the chamber into two compartments (one of which is intended to receive air at blower-pressure, and the other one of which is in communication with the atmosphere or blower inlet), an evacuated capsule of smaller diameter than the diaphragm, or piston, and contained in the second mentioned compartment, and means for transmitting movement from the diaphragm, or piston to the part to be actuated.

The accompanying drawing illustrates diagrammatically one embodiment of the invention.

Referring to the drawing, a body part $a$ has formed in it a chamber. The latter is divided into two compartments $b$, $c$ by a flexible diaphragm $d$ which, if desired, may be spring-loaded. Alternatively a piston contained in a cylindrical chamber may be used instead of a diaphragm. The compartment $b$ has a pipe connection whereby air may be by-passed to it from the discharge side of the blower. The compartment $c$ is in communication with the outer atmosphere or the blower inlet. In the latter compartment is contained a closed and axially deformable capsule $e$ which is evacuated and which is mounted co-axially with the diaphragm. Also at the end remote from the diaphragm it is rigidly supported in the body part. The diaphragm and the adjacent end of the capsule are interconnected by a stem $f$ to which is attached one end of a lever $g$.

It is essential to the invention that the capsule $e$ shall be of smaller diameter than the effective diameter of the diaphragm, but the relative diameters of capsule and diaphragm may vary according to the requirements of the particular prime mover on which the fuel control means is to be used. The appropriate relation between the two diameters can, however, be readily ascertained by trial or by calculation from known data.

The force exerted on the diaphragm by blower-air pressure is opposed in the part by the pressure of the atmosphere or pressure of the air entering the blower, and in part by the capsule (as well as a spring when this is provided). In other words the effective force acting on the diaphragm, is in part dependent on the absolute pressure of the blower air and in part on the difference of blower air and atmospheric air or blower inlet pressure, and the desired result is obtained by suitably correlating these two pressures. By the simple device above described, the control of the fuel-air ratio under idling conditions can be made to conform more closely to the theoretical requirements than has hitherto been possible with the means previously used for the same duty.

In the example illustrated the lever $g$ is used to control a throttle in the fuel supply pipe, the fuel being supplied from a variable delivery pump $h$ to a burner $i$ through the throttle. The throttle consists of a plug $j$ which is movable relatively to an orifice $k$ situated between the fuel inlet $m$ and outlet $n$. Also the throttle is loaded by springs $o$ attached to the lever $g$ and body part as shown, and is formed on or connected to a piston $p$ in a cylinder $q$, both ends of the cylinder being in communication through a restricted orifice $r$. The end of the cylinder remote from the inlet $m$ has in communication with it a vent passage $s$ which is controlled by a valve $t$ on the end of the lever remote from the end connected to the diaphragm $d$, the regions containing the two ends of the lever $g$ being isolated from each other as shown.

The arrangement is such that when the valve $t$ is closed, the plug $j$ is moved by the springs $o$ to its position of minimum fuel supply. When the valve $t$ is opened by the forces acting on the diaphragm $d$, the preponderating fuel pressure acting on the upper side of the piston $p$ moves the latter so as to cause the plug $j$ to increase the rate of fuel flow to the burner, the increased rate being dependent on the extent of opening of the valve $t$.

Also in the drawing there is shown an associated means for varying the pump output in response to the fuel pressure difference between the inlet and outlet $m$, $n$. A chamber $v$ is divided into two compartments by a diaphragm $w$ which is loaded by a spring $x$. The compartment containing the spring is in communication with the outflow side of the throttle, the other compartment being in communication with the inflow side of the throttle. The diaphragm acts through a stem 2 on a lever 3 loaded by a spring 4 and carrying a valve 5 which controls a vent 6 from a liquid operated servomechanism which controls the pump output. This servo-mechanism is of known form and comprises a piston 7 contained in a cylinder 8 and loaded by a spring 9. One end of the cylinder is in communication with the pump outlet through an unrestricted port 10, and the other through a restricted port 11. When the valve 5 is closed the spring 9 moves the piston 7 in the direction for increasing the pump output, and when the valve 5 is open, the preponderating liquid pressure acting on the piston in opposition to the spring moves this piston in the direction for reducing the pump output.

Having thus described my invention what I claim as new and desire to secure by Letters Patent is:

1. In means for automatically controlling the supply of liquid fuel to a prime mover in response to variations in liquid fuel pressure and blower-air pressure, the combination with a movable part to be actuated by blower-air pressure of a body having therein a chamber, a fluid pressure responsive member dividing the chamber into two compartments and operatively connected to said movable part, means for admitting air at blower air pressure into one of said compartments, means for admitting air at atmospheric or blower inlet pressure to the other of said compartments, and an evacuated capsule located in the said second mentioned compartment and operatively connected to said pressure responsive member to oppose the action of the air at blower pressure thereon, said capsule having an effective diameter less than that of the pressure responsive member whereby the force exerted on said member is in part dependent on the absolute pressure of the blower air and in part on the difference between the pressure of blower air and blower inlet or atmospheric pressure, whereby the fuel-air ratio supplied to the prime mover is maintained at desired values under idling conditions of the prime mover.

2. Means according to claim 1, in which the part to be actuated comprises a valve for controlling a liquid operated servo-mechanism, and further comprising a throttle member for controlling the supply of fuel actuated by said servo-mechanism.

3. A pressure operated valve for automatically controlling the supply of liquid fuel to a prime mover supplied with air from a blower comprising, in combination, a valve-actuating movable part, means responsive to liquid fuel pressure for actuating said part, a chamber, a fluid pressure responsive member operatively connected to said movable part and dividing said chamber into two compartments, means for affording a connection for air at blower air pressure to one of said compartments, means for affording a connection for air at atmospheric or blower inlet pressure to the other of said compartments, and an evacuated capsule located in the said second mentioned compartment and operatively connected to said pressure responsive member to oppose the action of the air at blower pressure thereon, said capsule having an effective diameter less than that of the pressure responsive member whereby the force exerted on said member will be in part dependent on the absolute pressure of blower air and in part on the difference between the pressure of blower air and blower inlet or atmospheric pressure.

OWEN NAPIER LAWRENCE.

References Cited in the file of this patent

UNITED STATES PATENTS

| Number | Name | Date |
| --- | --- | --- |
| 1,419,177 | Stahl | June 13, 1922 |
| 2,503,048 | Ifield | Apr. 4, 1950 |
| 2,506,694 | Watson et al. | May 9, 1950 |
| 2,524,444 | Ifield | Oct. 3, 1950 |
| 2,534,821 | Ifield | Dec. 19, 1950 |
| 2,566,319 | Deacon | Sept. 4, 1951 |

FOREIGN PATENTS

| Number | Country | Date |
| --- | --- | --- |
| 615,451 | Great Britain | Jan. 6, 1949 |